(12) United States Patent
Peng

(10) Patent No.: US 10,715,546 B2
(45) Date of Patent: Jul. 14, 2020

(54) WEBSITE ATTACK DETECTION AND PROTECTION METHOD AND SYSTEM

(71) Applicant: Tencent Technology (Shenzhen) Company Limited, Shenzhen (CN)

(72) Inventor: Dandan Peng, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 16/296,065

(22) Filed: Mar. 7, 2019

(65) Prior Publication Data

US 2019/0207973 A1 Jul. 4, 2019

Related U.S. Application Data

(63) Continuation of application No. PCT/CN2017/107784, filed on Oct. 26, 2017.

(30) Foreign Application Priority Data

Nov. 23, 2016 (CN) .......................... 2016 1 1049081
Nov. 24, 2016 (CN) .......................... 2016 1 1061771

(51) Int. Cl.
*H04L 29/06* (2006.01)
*G06F 17/18* (2006.01)
(Continued)

(52) U.S. Cl.
CPC .......... *H04L 63/1458* (2013.01); *G06F 17/18* (2013.01); *G06F 21/554* (2013.01);
(Continued)

(58) Field of Classification Search
CPC ............. H04L 63/1441; H04L 63/1433; H04L 63/1458; H04L 63/1466; H04L 63/1483;
(Continued)

(56) References Cited

U.S. PATENT DOCUMENTS

| 7,676,841 | B2 * | 3/2010 | Sobchuk | G06F 21/56 |
| | | | | 726/23 |
| 8,347,383 | B2 * | 1/2013 | Mori | H04L 41/22 |
| | | | | 713/188 |

(Continued)

FOREIGN PATENT DOCUMENTS

| CN | 101902366 A | 12/2010 |
| CN | 103095711 A | 5/2013 |

(Continued)

OTHER PUBLICATIONS

Tencent Technology, IPRP, PCT/CN2017/107784, May 28, 2019, 5 pgs.

(Continued)

*Primary Examiner* — Hosuk Song
(74) *Attorney, Agent, or Firm* — Morgan, Lewis & Bockius LLP

(57) ABSTRACT

Embodiments of this application disclose a website attack detection and protection method and system performed by a computing device, applied to the field of information processing technologies. In the method in the embodiments, the computing device calculates a parameter value of an information aggregation degree parameter corresponding to each field included in a header of a request for accessing a website, and then determines, according to the parameter value or a variation degree of the parameter value of the information aggregation degree parameter of the field, whether the website suffers a Challenge Collapsar attack.

18 Claims, 9 Drawing Sheets

(51) Int. Cl.
*G06F 21/57* (2013.01)
*G06F 21/55* (2013.01)

(52) U.S. Cl.
CPC ........ *G06F 21/577* (2013.01); *H04L 63/0838* (2013.01); *H04L 63/1416* (2013.01)

(58) Field of Classification Search
CPC ... H04L 63/1416; G06F 21/554; G06F 21/577
See application file for complete search history.

(56) References Cited

U.S. PATENT DOCUMENTS

| | | | | |
|---|---|---|---|---|
| 8,438,639 | B2* | 5/2013 | Lee | H04L 43/16 726/22 |
| 8,543,807 | B2* | 9/2013 | Oh | H04L 63/1458 709/203 |
| 8,844,034 | B2* | 9/2014 | Lin | H04L 63/1458 726/22 |
| 2011/0185422 | A1 | 7/2011 | Khayam et al. | |

FOREIGN PATENT DOCUMENTS

| | | |
|---|---|---|
| CN | 104009983 A | 8/2014 |
| CN | 104113519 A | 10/2014 |
| CN | 104468554 A | 3/2015 |
| CN | 104601556 A | 5/2015 |
| CN | 104935609 A | 9/2015 |
| CN | 105429977 A | 3/2016 |
| CN | 105991511 A | 10/2016 |

OTHER PUBLICATIONS

Tencent Technology, ISRWO, PCT/CN2017/107784, Nov. 28, 2017, 7 pgs.

* cited by examiner

WEBSITE ATTACK DETECTION AND PROTECTION METHOD AND SYSTEM

CROSS-REFERENCE TO RELATED APPLICATIONS

This application is a continuation application of PCT/CN2017/107784, entitled "METHOD AND SYSTEM FOR WEBSITE ATTACK DETECTION AND PREVENTION" filed on Oct. 26, 2017, which claims priority to Chinese Patent Application 201611049081.X, filed with the Chinese Patent Office on Nov. 23, 2016 and entitled "WEBSITE ATTACK DETECTION METHOD AND SYSTEM", and Chinese Patent Application 201611061771.7, filed with the Chinese Patent Office on Nov. 24, 2016 and entitled "ATTACK FEATURE DETECTION METHOD AND APPARATUS", all of which are incorporated herein by reference in their entireties.

FIELD OF THE TECHNOLOGY

This application relates to the field of information processing technologies, and in particular, to a website attack detection and protection method and system.

BACKGROUND OF THE DISCLOSURE

A Challenge Collapsar (CC) attack means that an attacker generates, by using an agent server or a chicken, an authorized request pointed to an aggrieved host, to implement a distributed denial of service (DDOS) and masquerade. The chicken herein is also referred to as a zombie computer, which may be a computer remotely controlled by a hacker. For example, a user is guided, by using a "gray bird" to click, or a computer is cracked by a hacker, or a user computer is planted with a Trojan horse due to vulnerability. A hacker can randomly control the computer and do anything by using the computer. The chicken is generally used as a DDOS attack. The chicken may be various systems such as Windows, Linux, and Unix, and may alternatively be a server of a company, an enterprise, a school, or a government army.

SUMMARY

Embodiments of this application provide a website attack detection method and system, to accurately determine whether a website suffers a CC attack, avoiding a misjudgement.

A first aspect of this application provides a website attack detection method performed by a computing device having one or more processors and memory storing a plurality of programs to be executed by the computing device, the method comprising:

detecting a request for accessing a website, the request for accessing the website including a header comprising a plurality of fields;

calculating a parameter value of an information aggregation degree parameter corresponding to each of the plurality of fields; and determining, in accordance with a determination that the parameter value of the information aggregation degree parameter of the field exceeds a corresponding first preset range or a variation degree of the parameter value of the information aggregation degree parameter of the field exceeds a corresponding second preset range, that the website suffers a Challenge Collapsar attack.

A second aspect of this application provides a computing device for website attack detection having one or more processors, memory, and a plurality of programs stored in the memory that, when executed by the one or more processors, cause the computing device to perform the aforementioned website attack detection method.

A third aspect of this application provides a non-transitory computer readable storage medium storing a plurality of instructions in connection with a computing device having one or more processors for website attack detection. The plurality of instructions, when executed by the one or more processors, cause the computing device to perform the aforementioned website attack detection method.

BRIEF DESCRIPTION OF THE DRAWINGS

To describe the technical solutions in the embodiments of this application or in the existing technology more clearly, the following briefly describes the accompanying drawings required for describing the embodiments or the existing technology. Apparently, the accompanying drawings in the following description show merely some embodiments of this application, and a person of ordinary skill in the art may still derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are merely some embodiments of this application rather than all of the embodiments. All other embodiments obtained by a person of ordinary skill in the art based on the embodiments of this application without creative efforts shall fall within the protection scope of this application.

In the specification, the claims, and the foregoing accompanying drawings of this application, the terms "first", "second", "third", "fourth", and so on (if existing) are intended to distinguish between similar objects rather than describe a specific sequence or a precedence order. It should be understood that, the terms used in this way is exchangeable in a proper case, so that the embodiments described herein of this application can be implemented in another order except those shown or described herein. Moreover, the terms "include", "contain" and any other variants mean to cover the non-exclusive inclusion, for example, a process, method, system, product, or device that includes a series of steps or units is not necessarily limited to those expressly listed units, but may include other steps or units not expressly listed or inherent to such a process, method, system, product, or device.

In a CC attack detection method, when traffic of a website exceeds a specified threshold such as 100 query per second (QPS), it is determined that the website suffers a CC attack and protection is enabled. However, a CC attack below the threshold cannot be detected by using this method, and if traffic increases when an activity is launched on the website, it may be determined as a CC attack by mistake.

Figure 1:
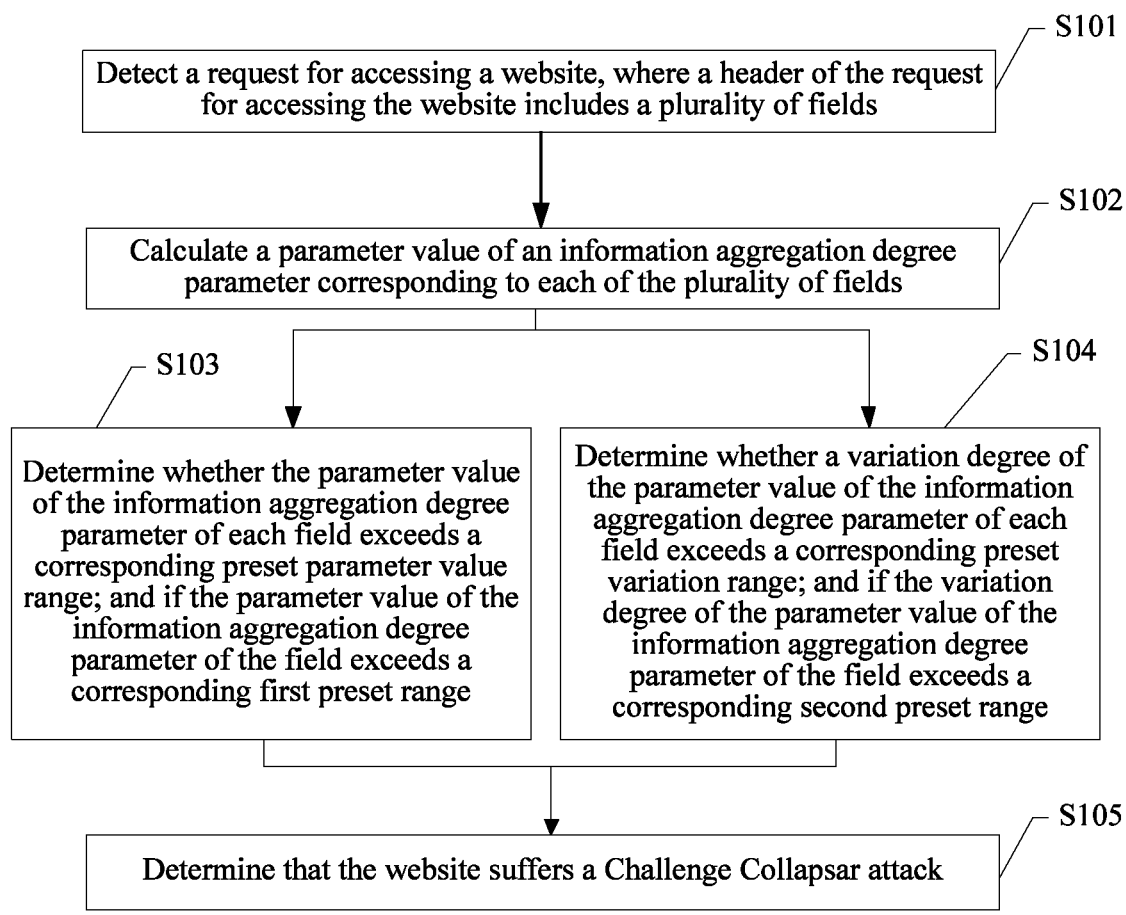
FIG. 1 is a flowchart of a website attack detection method according to an embodiment of this application.

An embodiment of this application provides a website attack detection method, applied to a web site attack detection system, a flowchart is shown in FIG. 1, and the method includes:

Step S101: Detect a request for accessing a website, where a header of the request for accessing the website includes a plurality of fields.

It may be understood that, when a user accesses a network by using a client, the user sends a request for accessing the website to a server of the website. Usually, the access request is a Hypertext Transfer Protocol (HTTP) request. A header of the access request may include the following fields: a user agent (User_agent), a temporary file Cookie, a recommender (Referer), a data type that the client is intended to accept (Accept), and a common gateway interface (CGI). Each field includes a plurality of discrete random symbols.

Step S102: Calculate a parameter value of an information aggregation degree parameter corresponding to each of the plurality of fields, and then perform step S103 or S104.

In this embodiment of this application, after calculating the parameter value of the information aggregation degree parameter corresponding to each of the plurality of fields, whether the website suffers a CC attack may be determined according to the parameter value or a variation degree of the parameter value of the information aggregation degree parameter of the field. Specifically, whether the parameter value or the variation degree of the parameter value may be determined, according to an actual situation, to be selected. If the parameter value of the information aggregation degree parameter of the field is selected to determine whether the website suffers a CC attack, step S103 is performed. If the variation degree of the parameter value of the information aggregation degree parameter of the field is selected to determine whether the website suffers a CC attack, step S104 is performed.

The information aggregation degree parameter of the field may indicate an aggregation degree of information represented by a plurality of symbols included in the field. In this embodiment, the information aggregation degree parameter may be represented by using information entropy.

In the information theory, the information entropy is used to measure an uncertainty degree of a signal source, that is, a size of an information volume. If a signal source symbol has n values: U1 ... Ui ... Un, corresponding probabilities are: P1 ... Pi ... Pn, and emergence of various symbols are independent of each other, an average uncertainty degree of the signal source should be an uncertainty degree of a signal symbol—a statistical average value (that is, expected E) of log Pi, which is referred to as information entropy H (U), that is:

The smaller information entropy is, the lower an uncertainty degree of a signal source is. If the information entropy is 0, it indicates that content of the signal source is a fixed value.

In this embodiment, if a field includes n symbols, the information entropy of the field is a statistical average value of an information aggregation degree parameter of one of n symbols. The smaller information entropy the more aggregated information of the field.

Step S103: Determine whether the parameter value of the information aggregation degree parameter of each field exceeds a corresponding preset parameter value range; and if the parameter value of the information aggregation degree parameter of the field exceeds a corresponding first preset range, perform step S105; or if the parameter value of the information aggregation degree parameter of the field does not exceed a corresponding first preset range, determine that the website does not suffer a CC attack.

It may be understood that, preset parameter value ranges of all the fields are different. A preset parameter value range corresponding to each field refers to a parameter value range of an aggregation degree parameter of the field when the website does not suffer a CC attack. Usually, a parameter value within the parameter value range indicates that information of the corresponding field is relatively scattered. If the parameter value of the aggregation degree parameter of the field exceeds the first preset range, it indicates that information of the field is relatively concentrated. In addition, the preset parameter value range of each field may be obtained by the website attack detection system according to historical data (that is, a historical access request when the website does not suffer a CC attack), or may be obtained by a user according to experience, or may be prestored in the system.

If the parameter value of the information aggregation degree parameter of the field that is calculated in step S102 is information entropy of the field, whether the information entropy of the field is less than a corresponding threshold may be determined when step S103 is performed. If the information entropy of the field is less than a corresponding first threshold, step S105 is performed.

Step S104: Determine whether a variation degree of the parameter value of the information aggregation degree parameter of each field exceeds a corresponding preset variation range; and if the variation degree of the parameter value of the information aggregation degree parameter of the field exceeds a corresponding second preset range, perform step S105; or if the variation degree of the parameter value of the information aggregation degree parameter of the field does not exceed a corresponding second preset range, determine that the website does not suffer a CC attack.

It may be understood that, preset variation ranges corresponding to all the fields are different. A preset variation range corresponding to each field refers to a parameter value variation range of an aggregation degree parameter of the field when the website does not suffer a CC attack. Usually, a parameter value variation degree within the parameter value variation range indicates that a variation of an information volume of the corresponding field is relatively scattered. If the variation degree of the aggregation degree parameter of the field exceeds the second preset range, it indicates that a variation of an information volume of the field is relatively great, for example, information of the field becomes relatively concentrated from being relatively scattered. In addition, the preset variation range of each field may be obtained by the website attack detection system according to historical data (that is, a historical access request when the website does not suffer a CC attack), or may be obtained by a user according to experience, or may be prestored in the system.

If the parameter value of the information aggregation degree parameter of the field that is calculated in step S102 is information entropy of the field, a ratio of the information entropy of each field to a corresponding baseline value may be used as the variation degree of the parameter value of the information aggregation degree parameter of each field when step S104 is performed, and whether the ratio of the information entropy of each field to the corresponding baseline value is less than a corresponding threshold is determined. If the ratio of the information entropy of each field to the corresponding baseline value is less than a corresponding second threshold, step S105 is performed.

Step S105: Determine that the website suffers a CC attack.

Further, if it is determined that the website suffers a CC attack, the website attack detection system may further enable a limitation policy for the request for accessing the website. For example, an access request in which information of a field is the same as information in a blacklist is limited from accessing a server of the website, or an access request having some features is limited from accessing the server of the website, or a transmission speed of the request for accessing the website is limited. Alternatively, another policy may be used. For example, a verification code is delivered to the client, a 7-layer request is discarded, and a 4-layer Transmission Control Protocol (TCP) connection is discarded.

It should be noted that in this embodiment, after step S102 is performed for all fields in the header of the request for accessing the website, step S103 or S104 is performed for the parameter value of the information aggregation degree parameter corresponding to each field. Alternatively, after step S102 is performed for a field in the header of the request for accessing the website, step S103 or S104 may be performed for the parameter value of the information aggregation degree parameter of the field. If it is determined, according to the parameter value of the aggregation degree parameter of the field, that the website suffers a CC attack, the parameter value of the information aggregation degree parameter of another field does not need to be calculated again.

It can be learned that in the method of this embodiment, the website attack detection system calculates the parameter value of the information aggregation degree parameter corresponding to each field included in the header of the request for accessing the website, and then determines, according to the parameter value or the variation degree of the parameter value of the information aggregation degree parameter of the field, whether the website suffers a CC attack. Because when generating an attack request (that is, a request for accessing the website), to reduce performance consumption, an attacker sets information of some fields in the attack request to fixed values. In this way, in this embodiment of this application, whether the website suffers a CC attack may be detected by determining the parameter value of the aggregation degree parameter of each field, thereby avoiding defects in the prior art such as that an attack lower than the threshold cannot be detected and a misjudgement caused by a traffic increase due to an activity launched on the website.

Figure 2:
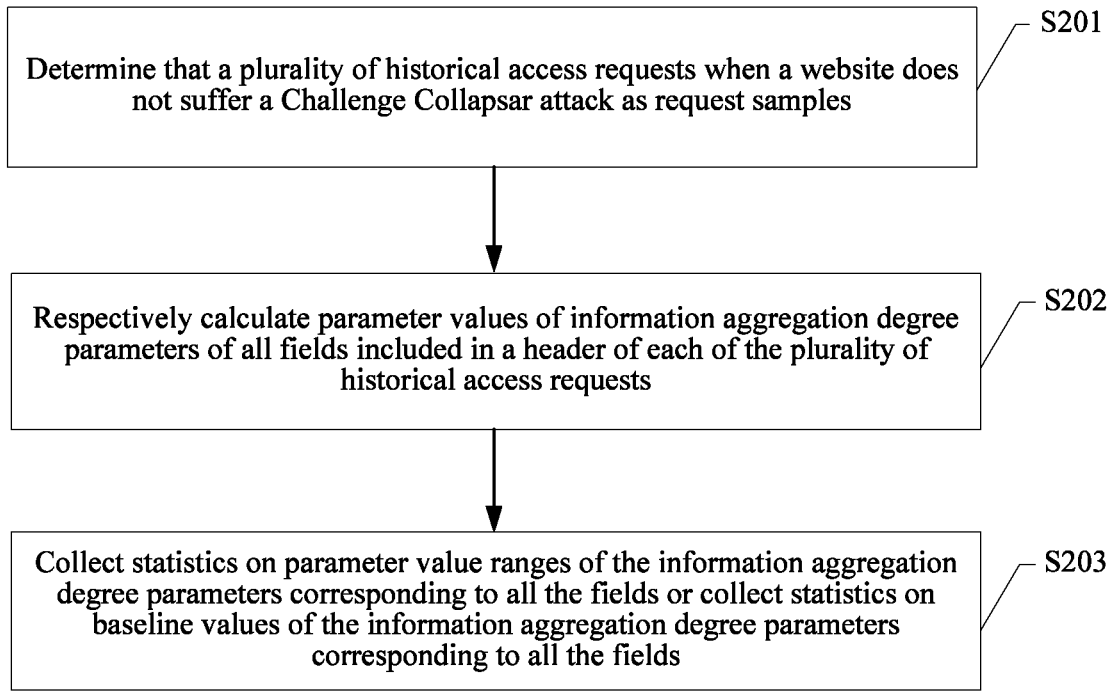
FIG. 2 is a flowchart of a method for training a preset parameter value range corresponding to each field by a website attack detection system according to an embodiment of this application.

Referring to FIG. 2, in a specific embodiment, before performing step S103 or S104, the website attack detection system may further perform the following steps:

Step 201: Determine that a plurality of historical access requests when the website does not suffer a CC attack as request samples.

Step 202: Respectively calculate parameter values of information aggregation degree parameters of all fields included in a header of each of the plurality of historical access requests. The parameter value of the information aggregation degree parameter herein may be information entropy, and calculation of information entropy of each field is described in the foregoing embodiment, and details are not described herein again.

Step S203: Collect statistics on parameter value ranges of the information aggregation degree parameters corresponding to all the fields or collect statistics on baseline values of the information aggregation degree parameters corresponding to all the fields. The first preset range is the parameter value range of the information aggregation degree parameter corresponding to the field, and the variation degree of the parameter value of the information aggregation degree parameter corresponding to the field is a ratio of the parameter value of the information aggregation degree parameter of the field to the corresponding baseline value.

When statistics on baseline values of the information aggregation degree parameter corresponding to the field are collected, an average value of the parameter values that are of the information aggregation degree parameter corresponding to the field and that are included in the plurality of request samples is used as the baseline value.

It should be noted that, the parameter value ranges of the information aggregation degree parameters corresponding to the plurality of fields are different, and the baseline values of the information aggregation degree parameters corresponding to the plurality of fields are different.

Figure 3:
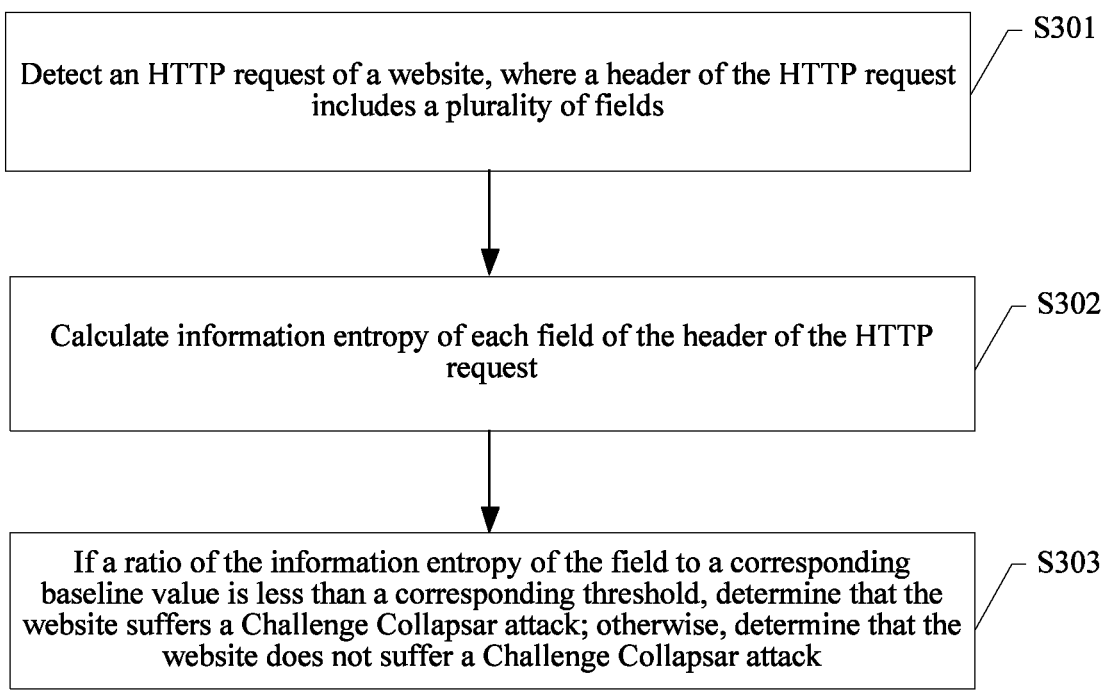
FIG. 3 is a flowchart of a website attack detection method according to an embodiment of this application.

The website attack detection method in this application is described below by using a specific embodiment. In this embodiment, the request for accessing the website is an HTTP request, and the parameter value of the information aggregation degree parameter is measured by using the information entropy, and the ratio of the parameter value of the information aggregation degree parameter of the field to the corresponding baseline value is used as the variation degree of the parameter value of the information aggregation degree parameter of the field. Referring to FIG. 3, the method in this embodiment of this application includes:

Step S301: Detect an HTTP request of a website, where a header of the HTTP request includes fields User_agent, Cookie, Referer, Accept, and CGI.

Step S302: Calculate information entropy of each field of the header of the HTTP request.

Step S303: If a ratio of the information entropy of the field to a corresponding baseline value is less than a corresponding threshold, determine that the website suffers a CC attack; otherwise, determine that the website does not suffer a CC attack.

For example, when the website attack detection system obtains, by training a request sample, that the website does not suffer a CC attack. A baseline value of the User_agent field included in the HTTP request is 100. During real-time detection, it is discovered that information entropy of the User_agent field included in the HTTP request of the website is suddenly changed to 1. Because $\frac{1}{100}=0.01<0.5$ (a threshold), it is determined that the website suffers a CC attack.

After it is determined that the website suffers a CC attack, the website enables an attack feature identification function, analyzes traffic of the website during the attack, and calculates an aggregation status of the request on each header field. Content of the field on which the request is aggregated is identified as an attack feature, and each request may be matched with the identified attack feature. If the request is not matched with the identified attack feature, the request is considered as a normal request, and the request is forwarded to the website. If the request is matched with the identified attack feature, the request is considered as an attack request, and the attack request is intercepted.

Figure 4:
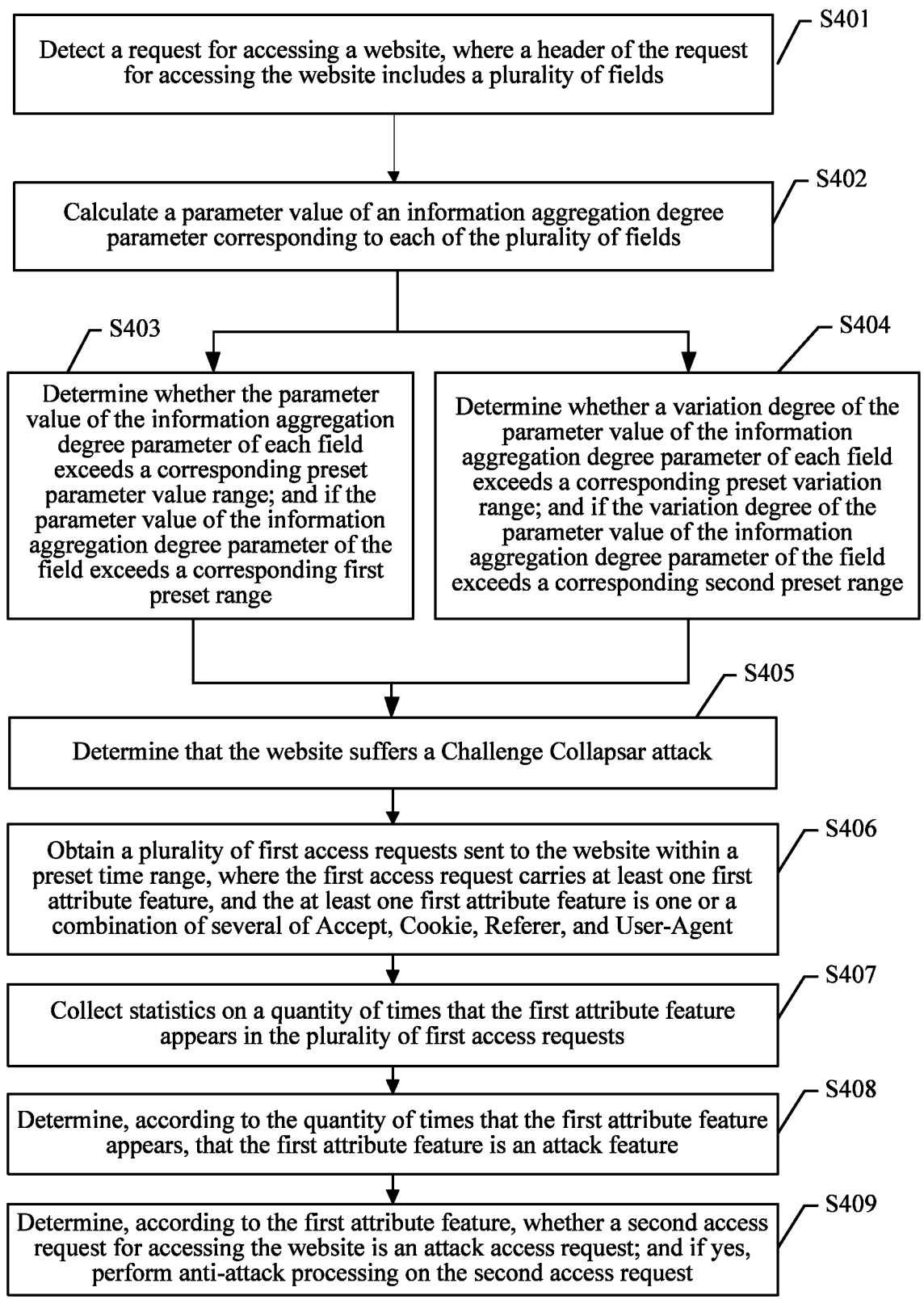
FIG. 4 is a flowchart of another website attack detection method according to an embodiment of this application.

FIG. 4 is a flowchart of a website attack detection and intercepting method according to an embodiment of this application. As shown in FIG. 4, the method may include the following steps:

Step S401: Detect a request for accessing a website, where a header of the request for accessing the website includes a plurality of fields.

Step S402: Calculate a parameter value of an information aggregation degree parameter corresponding to each of the plurality of fields, and then perform step S403 or S404.

Step S403: Determine whether the parameter value of the information aggregation degree parameter of each field exceeds a corresponding preset parameter value range; and if the parameter value of the information aggregation degree parameter of the field exceeds a corresponding first preset range, perform step S405; or if the parameter value of the information aggregation degree parameter of the field does not exceed a corresponding first preset range, determine that the website does not suffer a CC attack.

Step S404: Determine whether a variation degree of the parameter value of the information aggregation degree parameter of each field exceeds a corresponding preset variation range; and if the variation degree of the parameter value of the information aggregation degree parameter of the field exceeds a corresponding second preset range, perform step S405; or if the variation degree of the parameter value of the information aggregation degree parameter of the field does not exceed a corresponding second preset range, determine that the website does not suffer a CC attack.

Step S405: Determine that the website suffers a CC attack.

For specific implementation methods of step S401 to step S405, refer to those of step S101 to S105, and details are not described herein again.

Step S406: Obtain a plurality of first access requests sent to the website within a preset time range, where the first access request carries at least one first attribute feature, and the at least one first attribute feature is one or a combination of several of Accept, Cookie, Referer, and User-Agent.

Step S407: Collect statistics on a quantity of times that the first attribute feature appears in the plurality of first access requests.

Step S408: Determine, according to the quantity of times that the first attribute feature appears, that the first attribute feature is an attack feature.

Step S409: Determine, according to the first attribute feature, whether a second access request for accessing the website is an attack access request; and if yes, perform anti-attack processing on the second access request.

In this embodiment, the plurality of first access requests including the at least one first attribute feature is sent to a target website within the preset time range; statistics on the quantity of times that each first attribute feature appears in the plurality of first access requests are collected, and the first attribute feature is determined as the attack feature according to the quantity of times that the first attribute feature appears. In this way, statistics on the quantity of times that the first attribute feature appears in the first access request are collected to determine the attack feature, so that a currently existing attack feature is determined in time during real-time access to the website, thereby improving the efficiency for detecting the attack feature.

Figure 5:
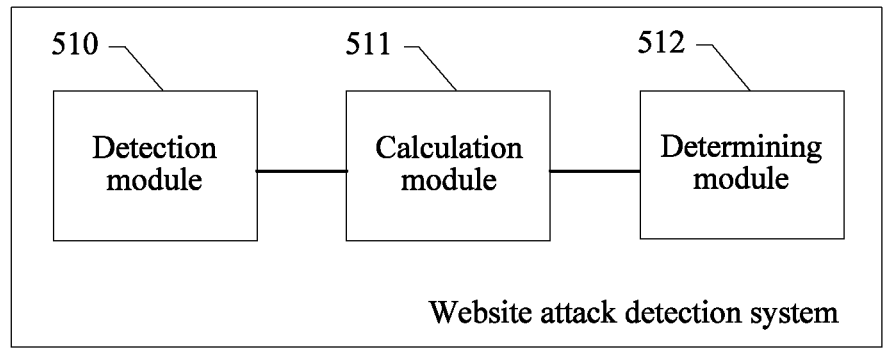
FIG. 5 is a schematic structural diagram of a website attack detection system according to an embodiment of this application.

An embodiment of this application further provides a website attack detection system. A schematic structural diagram of the website attack detection system is shown in FIG. 5. The system may specifically include:

a detection module 510, configured to detect a request for accessing a website, a header of the request for accessing the website including a plurality of fields;

a calculation module 511, configured to calculate a parameter value of an information aggregation degree parameter corresponding to each of the plurality of fields included in the header of the access request detected by the detection module 510; and a determining module 512, configured to: if the parameter value of the information aggregation degree parameter of the field that is calculated by the calculation module 511 exceeds a corresponding first preset range or a variation degree of the parameter value of the information aggregation degree parameter of the field exceeds a corresponding second preset range, determine that the website suffers a CC attack.

In a specific embodiment, the calculation module 511 is specifically configured to: if the information aggregation degree parameter is information entropy, the field includes n symbols, and the information entropy is a statistical average value of the information aggregation degree parameter of each of the n symbols when the information entropy of the field is calculated, the determining module 512 is specifically configured to: if the information entropy of the field is less than a corresponding first threshold or a ratio of the information entropy of the field to a corresponding baseline value is less than a corresponding second threshold, determine that the website suffers a CC attack.

In the system of this embodiment, the calculation module 511 calculates the parameter value of the information aggregation degree parameter corresponding to each field included in the header of the request for accessing the website, and then the determining module 512 determines, according to the parameter value of the information aggregation degree parameter of the field or the variation degree of the parameter value, whether the website suffers a CC attack. Because when generating an attack request (that is, a request for accessing the website), to reduce performance consumption, an attacker sets information of some fields in the attack request to fixed values. In this way, in this embodiment of this application, whether the website suffers a CC attack may be detected by determining the parameter value of the aggregation degree parameter of each field, thereby avoiding defects in the prior art such as that an attack lower than the threshold cannot be detected and a misjudgement caused by a traffic increase due to an activity launched on the website.

Figure 6:
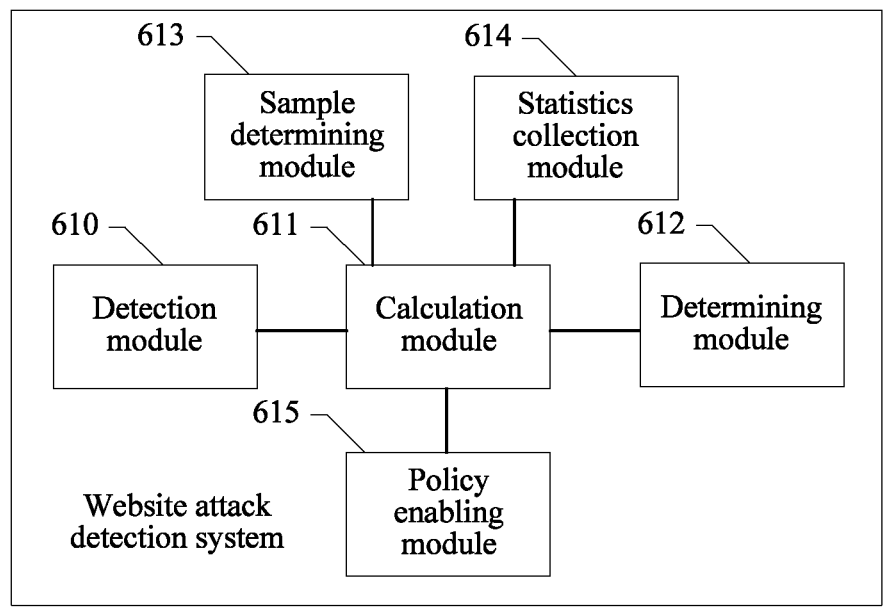
FIG. 6 is a schematic structural diagram of another website attack detection system according to an embodiment of this application.

Referring to FIG. 6, in a specific embodiment, in addition to the structure shown in FIG. 5, the website attack detection system may further include a sample determining module 613, a statistics collection module 614, and a policy enabling module 615.

The sample determining module 613 is configured to determine that a plurality of historical access requests when the website does not suffer a CC attack as request samples.

The calculation module 611 is further configured to respectively calculate parameter values of information aggregation degree parameters of all fields included in a header of each of the plurality of historical access requests determined by the sample determining module 613.

The statistics collection module 614 is configured to collect statistics on parameter value ranges that are of the information aggregation degree parameters corresponding to all the fields and that are calculated by the calculation module 611 or collect statistics on baseline values of the information aggregation degree parameters corresponding to all the fields. The first preset range is the parameter value range of the information aggregation degree parameter corresponding to the field, and the variation degree of the parameter value of the information aggregation degree parameter corresponding to the field is a ratio of the parameter value of the information aggregation degree parameter of the field to the corresponding baseline value. The parameter value ranges of the information aggregation degree parameters corresponding to the plurality of fields are different, and the baseline values of the information aggregation degree parameters corresponding to the plurality of fields are different.

Specifically, the statistics collection module 614 is specifically configured to: when collecting statistics on baseline values of the information aggregation degree parameter corresponding to the field, use an average value of the parameter values that are of the information aggregation degree parameter corresponding to the field and that are included in the plurality of request samples as the baseline value.

The policy enabling module 615 is configured to: when the determining module 612 determines that the website suffers a CC attack, enable a limitation policy for the request for accessing the website. Specifically, the limitation policy enabled by the policy enabling module 615 includes: limiting an access request in which information of a field is the same as information in a blacklist from accessing a server of the website, or limiting an access request having some features from accessing the server of the website, or limiting a transmission speed of the request for accessing the website, or the like.

In addition, the policy enabling module 615 may further enable another policy, for example, deliver a verification code to the client, discard a 7-layer request, and discard a 4-layer Transmission Control Protocol (TCP) connection.

Figure 7:
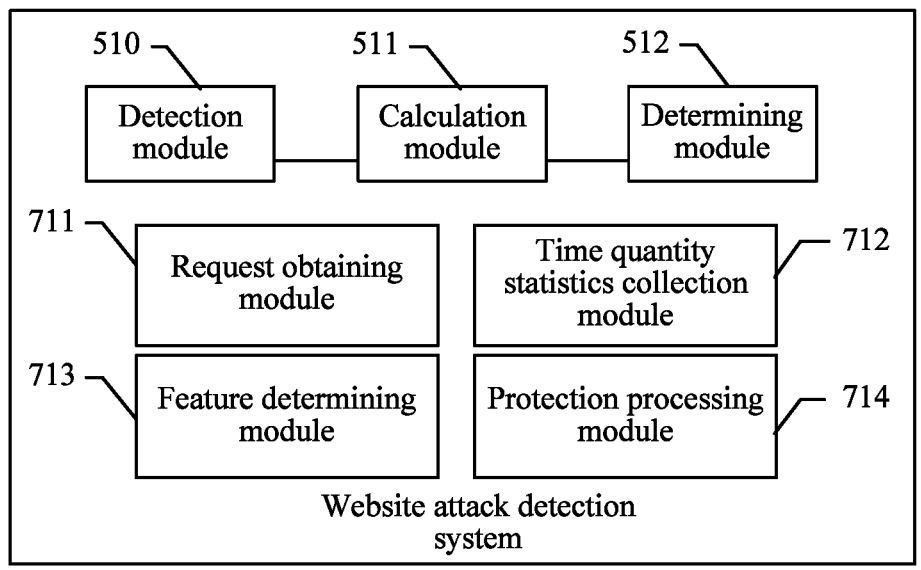
FIG. 7 is a schematic structural diagram of another website attack detection system according to an embodiment of this application.

Referring to FIG. 7, in a specific embodiment, in addition to the structure shown in FIG. 5, the website attack detection system may further include:

a request obtaining module 711, configured to obtain a plurality of first access requests sent to a target website within a preset time range, where the first access request carries at least one first attribute feature, and the at least one first attribute feature is one or a combination of several of Accept, Cookie, Referer, and User-Agent;

a time quantity statistics collection module 712, configured to collect statistics on a quantity of times that the first attribute feature appears in the plurality of first access requests;

a feature determining module 713, configured to determine, according to the quantity of times that the first attribute feature appears, that the first attribute feature is an attack feature; and a protection processing module 714, configured to determine, according to the attack feature, whether a second access request for accessing the website is an attack access request; and if yes, perform anti-attack processing on the second access request.

Figure 8:
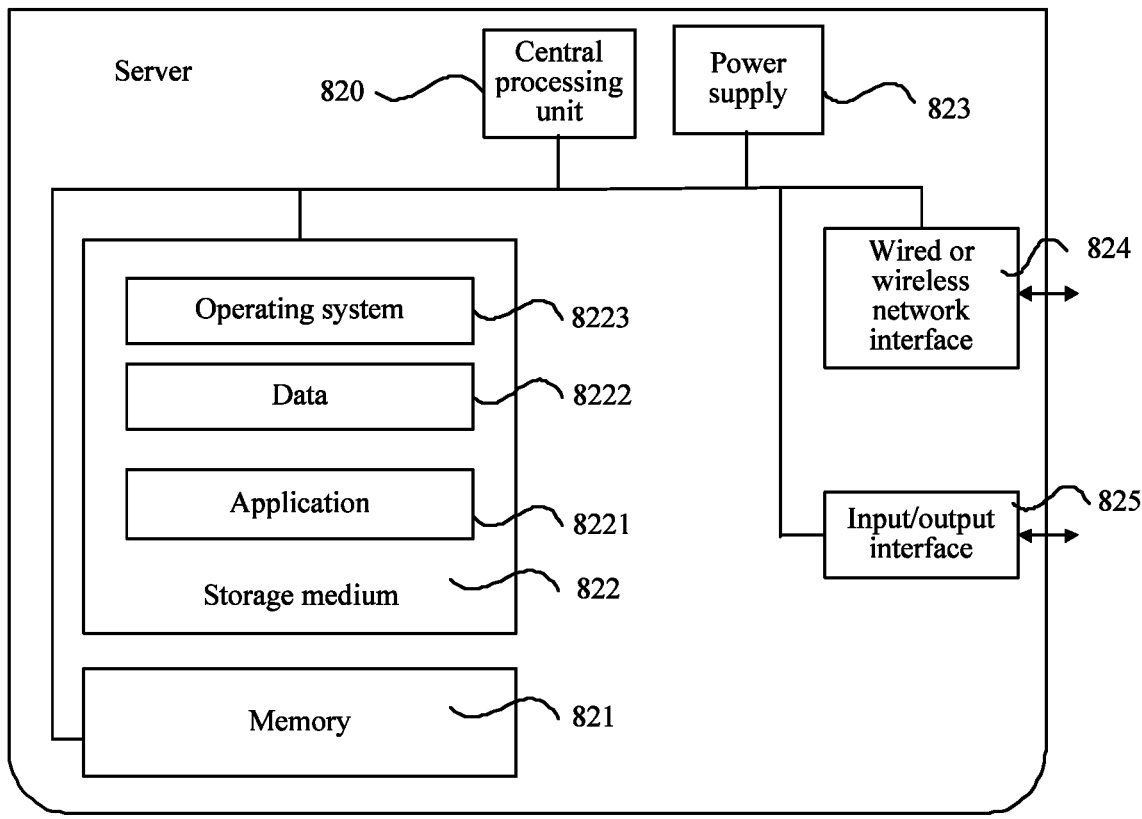
FIG. 8 is a schematic structural diagram of a server according to an embodiment of this application.

An embodiment of this application further provides a server. A schematic structural diagram of the server is shown in FIG. 8. The server may vary greatly due to different configurations or performance, and may include one or more central processing units (CPU) 820 (for example, one or more processors) and a memory 821, and one or more storage media 822 (for example, one or more mass storage devices) that store applications 8221 or data 8222. The memory 821 and the storage medium 822 may be transient or persistent storages. The program stored in the storage medium 822 may include one or more modules (which is not marked in the figure), and each module may include a series of instruction operations for the server. Still further, the CPU 820 may be configured to communicate with the storage medium 822, and perform, on the server, a series of instruction operations in the storage medium 822.

Specifically, the application 8221 stored in the storage medium 822 includes a website attack detection application, and the program may include the detection module 510, the calculation module 511, the determining module 512, the sample determining module 613, the statistics collection module 614, the policy enabling module 615, the request obtaining module 711, the time quantity statistics collection module 712, the feature determining module 713, and the protection processing module 714 of the website attack detection system, and details are not described herein again. Still further, the CPU 820 may be configured to communicate with the storage medium 822, and perform, on the server, a series of instruction operations that correspond to the website attack detection application and that are stored in the storage medium 822.

The server may further include one or more power supplies 823, one or more wired or wireless network interfaces 824, one or more input/output interfaces 825, and/or one or more operating systems 8223, for example, Windows Server™, Mac OS X™, Unix™, Linux™, or FreeBSD™.

The steps performed by the website attack detection system in the foregoing method embodiments may be based on the structure of the server shown in FIG. 8.

According to the foregoing method and apparatus provided in the embodiments of this application, the website attack detection system calculates the parameter value of the information aggregation degree parameter corresponding to each field included in the header of the request for accessing the website, and then determines, according to the parameter value or the variation degree of the parameter value of the information aggregation degree parameter of the field, whether the website suffers a CC attack. Because when generating an attack request (that is, a request for accessing the website), to reduce performance consumption, an attacker sets information of some fields in the attack request to fixed values. In this way, in the embodiments of this application, whether the website suffers a CC attack may be detected by determining the parameter value of the aggregation degree parameter of each field, thereby avoiding defects in the prior art such as that an attack lower than the threshold cannot be detected and a misjudgement caused by a traffic increase due to an activity launched on the website.

In addition, this embodiment of this application further provides a website attack protection method. After determining that the website suffers a CC attack, for a lot of access requests for accessing the website, whether these access requests are normal access requests or attack access requests needs to be identified, thereby performing intercepting or performing protection processing in a targeted manner.

The website attack protection method provided in this embodiment of this application may be applied to a scenario of accessing a target website. For example, a plurality of first access requests sent to the target website within a preset time range is obtained, where the first access request carries at least one first attribute feature, and the at least one first attribute feature is one or a combination of several of Accept, Cookie, Referer, and User-Agent; statistics on a quantity of times that the first attribute feature appears in the plurality of first access requests are collected; and the first attribute feature is determined as an attack feature according to the quantity of times that the first attribute feature appears. In this way, statistics on the quantity of times that the first attribute feature appears in the first access request are collected to determine the attack feature, so that a currently existing attack feature is determined in time during real-time access to the website, thereby improving the efficiency for detecting the attack feature. Therefore, the attack feature may be automatically identified in real-time and protection is performed.

A website attack protection apparatus in an embodiment of this application may be a background device having storage and communication functions and a service capable of detecting an attack feature, or may be a website attack protection module embedded in the background device. A user equipment in an embodiment of this application may be any device having storage and communication functions, for example, a tablet computer, a mobile phone, an e-reader, a remote control, a personal computer (Personal Computer, PC), a notebook computer, an in-vehicle device, a web television, or a wearable device.

Figure 9:
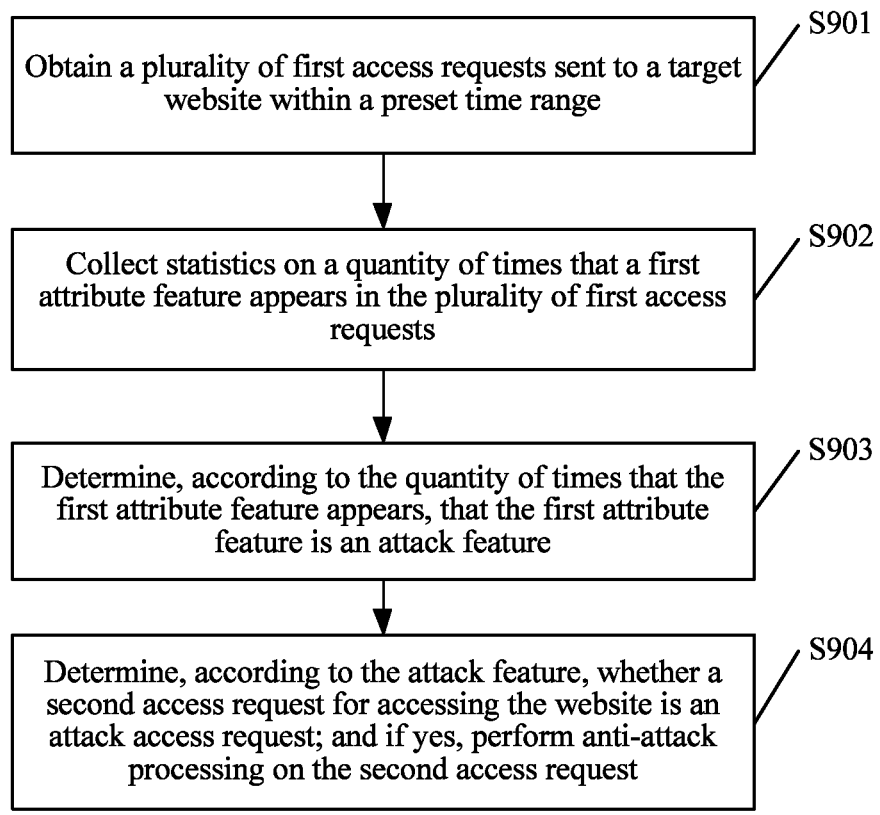
FIG. 9 is a schematic flowchart of a website attack protection method according to an embodiment of this application.

Referring to FIG. 9, FIG. 9 is a schematic flowchart of a website attack protection method according to an embodiment of this application. As shown in FIG. 9, the method in this embodiment of this application may include the following steps S901 to S903.

S901: Obtain a plurality of first access requests sent to a target website within a preset time range.

Specifically, the website attack protection apparatus obtains the plurality of first access requests sent to the target website within the preset time range. The preset time range is customized by the website attack protection apparatus. The target website may be any website that a user can access, for example, an enterprise website, a personal website, a commercial website, a government website, or an education website. The user may access the target website by using a web page browser.

Further, at least one first attribute feature is one or a combination of several of Accept, Cookie, Referer, and User-Agent. For example, the first access request may be a Hypertext Transfer Protocol (HTTP) request. The first attribute feature is carried in a header field of the HTTP request. The Accept is used to indicate a data type supported by a user terminal that sends the first access request; the Cookie is used to indicate a text file stored in the user terminal that sends the first access request; the Referer is used to indicate a uniform resource locator (URL) used by the user terminal that sends the first access request; the User-Agent is used to indicate a system environment of the user terminal that sends the first access request. The system environment includes a used operating system and its version, a central processing unit (CPU) type, a browser version, a browser language, a browser plug-in, and the like.

In some embodiments, the website attack protection apparatus in this embodiment of this application obtains the first access request that are within the preset time range, or the website attack protection apparatus may obtain a preset quantity of first access requests. This is not limited in this embodiment of this application.

In some embodiments, the website attack protection apparatus may perform the step of the obtaining a plurality of first access requests that are within a preset time range when monitoring the first access request for accessing the target website, thereby implementing a function of monitoring any access request for the target website in real-time.

S902: Collect statistics on a quantity of times that a first attribute feature appears in the plurality of first access requests.

Specifically, the website attack protection apparatus collects statistics on a quantity of times that each of the at least one first attribute feature appears in the plurality of first access requests. Description is made by using an example in which the first attribute feature is the "User-Agent", it is assumed that there are 1000 requests within the preset time range, because the User-Agent is used to indicate the system environment of the user terminal that sends the first access request, it is assumed that in the 1000 requests, information corresponding to the User-Agent includes: the QQ search engine, the Baidu search engine, the Sogou search engine, the 360 search engine, and the like. The website attack protection apparatus collects statistics on a quantity of times that information corresponding to each User-Agent appears in the 1000 requests, for example, a quantity of times that the Baidu search engine appears in the 1000 requests, and a quantity of times that the QQ search engine appears in the 1000 requests.

S903: Determine, according to the quantity of times that the first attribute feature appears, that the first attribute feature is an attack feature.

Specifically, the website attack protection apparatus determines, according to the quantity of times that the first attribute feature appears, that the first attribute feature is the attack feature. In a feasible solution, the website attack protection apparatus may determine, by setting a threshold indicating a maximum quantity of times that the first attribute feature appears, whether the first attribute feature is the attack feature. Alternatively, in another feasible solution, the website attack protection apparatus may determine, by setting a threshold indicating a maximum appearance probability, whether the first attribute feature is the attack feature. It may be understood that a probability that the first attribute feature appears in the preset time range is: dividing the quantity of times that the first attribute feature appears in the preset time range by a quantity of the first access requests within the preset time range.

In this embodiment of this application, the plurality of first access requests including the at least one first attribute feature that is sent to the target website within the preset time range is obtained, statistics on the quantity of times that each first attribute feature appears in the plurality of first access requests are collected, and the first attribute feature is determined as the attack feature according to the quantity of times that the first attribute feature appears. In this way, statistics on the quantity of times that the first attribute feature appears in the first access request are collected to determine the attack feature, so that a currently existing attack feature is determined in time during real-time access to the website, thereby improving the efficiency for detecting the attack feature.

S904: Determine, according to the attack feature, whether a second access request for accessing the website is an attack access request; and if yes, perform anti-attack processing on the second access request.

Figure 10:
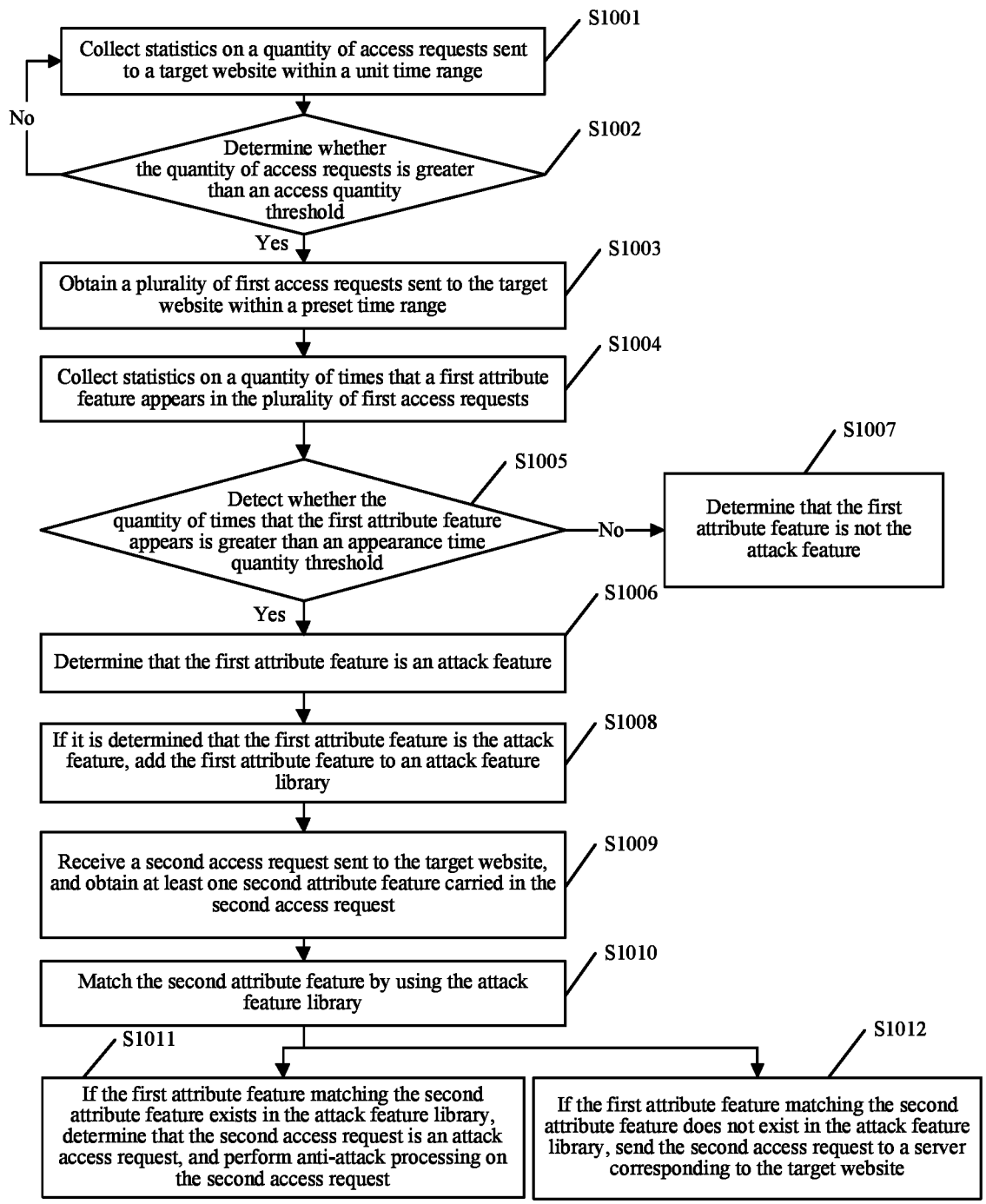
FIG. 10 is a schematic flowchart of another website attack protection method according to an embodiment of this application.

Referring to FIG. 10, FIG. 10 is a schematic flowchart of another website attack protection method according to an embodiment of this application. As shown in FIG. 10, the method in this embodiment of this application may include the following steps S1001 to S1012.

S1001: Collect statistics on a quantity of access requests sent to a target website within a unit time range.

Specifically, the website attack protection apparatus collects statistics on the quantity of access requests sent to the target website within the unit time range. The unit time range may be predefined by the website attack protection apparatus, for example, within 1 hour or within 20 minutes. Each time the website attack protection apparatus detects a request for accessing the target website within the unit time range, a quantity of access requests is increased by one, so that the quantity of access requests sent to the target website within the unit time range may be obtained.

S1002: Determine whether the quantity of access requests is greater than an access quantity threshold.

Specifically, the website attack protection apparatus determines whether the quantity of access requests is greater than the access quantity threshold. The access quantity threshold is predefined by the website attack protection apparatus, for example, 1000 or 2000. If the quantity of access requests is greater than the access quantity threshold, step S1003 is performed; or if the quantity of access requests is less than or equal to the access quantity threshold, step S1001 is continued to be performed.

In some embodiments, the access quantity threshold may be set according to a quantity of accesses that a server corresponding to the target website can bear within the unit time range. For example, the access quantity threshold is less than the quantity of accesses that the server can bear within the unit time range.

In this embodiment, whether to enable subsequent attack feature identification and protection operations is determined by using the foregoing method for determining whether the quantity of access requests is greater than the access quantity threshold.

In some other embodiments, website traffic may alternatively be detected by using information entropy by using the method shown in FIGS. 1 to 3. If the website is attacked, the subsequent attack feature identification and protection operations are enabled. For a specific procedure, refer to FIG. 4.

S1003: Obtain a plurality of first access requests sent to the target website within a preset time range.

Specifically, if the quantity of access requests within the unit time range is greater than the access quantity threshold, the website attack protection apparatus obtains the plurality of first access requests sent to the target website within the preset time range. The preset time range is customized by the website attack protection apparatus. The target website may be any website that a user can access, for example, an enterprise website, a personal website, a commercial website, a government website, or an education website. The user may access the target website by using a web page browser.

Further, at least one first attribute feature is one or a combination of several of Accept, Cookie, Referer, and User-Agent. For example, the first access request may be an HTTP request. The first attribute feature is carried in a header field of the HTTP request. The Accept is used to indicate a data type supported by a user terminal that sends the first access request; the Cookie is used to indicate a text file stored in the user terminal that sends the first access request; the Referer is used to indicate a URL used by the user terminal that sends the first access request; and the User-Agent is used to indicate a system environment of the user terminal that sends the first access request. The system environment includes a used operating system and its version, a CPU type, a browser version, a browser language, a browser plug-in, and the like.

In some embodiments, the website attack protection apparatus in this embodiment of this application obtains the first access request that is within the preset time range, or the website attack protection apparatus may obtain a preset quantity of first access requests. This is not limited in this embodiment of this application.

It should be noted that, the preset time range and the unit time range may be a same time range, or may be different time ranges. For example, the preset time range is less than the unit time range, or the preset time range is greater than the unit time range. For example, if it is assumed that the preset time range and the unit time range are an hour range from a first moment, when detecting that a quantity of access requests that are within the one hour range is greater than the access quantity threshold, the website attack protection apparatus obtains all access requests that are within the one hour range. For another example, it is assumed that the preset time range is two hours, and the unit time range is one hour, if it is detected that a quantity of access requests within an one hour range after a second moment is greater than the access quantity threshold, all access requests within a two hour range after the second moment are obtained.

S1004: Collect statistics on a quantity of times that a first attribute feature appears in the plurality of first access requests.

Specifically, the website attack protection apparatus collects statistics on a quantity of times that each of the at least one first attribute feature appears in the plurality of first access requests. Description is made by using an example in which the first attribute feature is the "User-Agent", it is assumed that there are 1000 requests within the preset time range, because the User-Agent is used to indicate the system environment of the user terminal that sends the first access request, it is assumed that in the 1000 requests, information corresponding to the User-Agent includes: the QQ search engine, the Baidu search engine, the Sogou search engine, the 360 search engine, and the like. The website attack protection apparatus collects statistics on a quantity of times that information corresponding to each User-Agent appears in the 1000 requests, for example, a quantity of times that the Baidu search engine appears in the 1000 requests, and a quantity of times that the QQ search engine appears in the 1000 requests.

S1005: Detect whether the quantity of times that the first attribute feature appears is greater than an appearance time quantity threshold.

Specifically, the website attack protection apparatus detects whether the quantity of times that the first attribute feature appears is greater than the appearance time quantity threshold. The appearance time quantity threshold is predefined by the website attack protection apparatus, and the appearance time quantity threshold may be set to different values according to different preset time ranges. If the quantity of times that the first attribute feature appears is greater than the appearance time quantity threshold, step S1006 is performed; or if the quantity of times that the first attribute feature appears is not greater than the appearance time quantity threshold, step S1007 is performed.

S1006: If yes, determine that the first attribute feature is an attack feature.

Specifically, if the quantity of times that the first attribute feature appears is greater than the appearance time quantity threshold, determine that the first attribute feature is the attack feature.

S1007: If not, determine that the first attribute feature is not the attack feature.

Specifically, if the quantity of times that the first attribute feature appears is not greater than the appearance time quantity threshold, it is determined that the first attribute feature is not the attack feature.

S1008: If it is determined that the first attribute feature is the attack feature, add the first attribute feature to an attack feature library.

Specifically, if it is determined that the first attribute feature is the attack feature, the website attack protection apparatus adds the first attribute feature to an attack feature library. The attack feature library includes a plurality of attack features used to detect access requests.

In some embodiments, the website attack protection apparatus may modify or delete the attack feature in the attack feature library or add an attack feature to the attack feature library, so that attack features stored in the attack feature library are more completed, thereby improving the effectiveness for detecting the attack feature.

S1009: Receive a second access request sent to the target website, and obtain at least one second attribute feature carried in the second access request.

Specifically, after adding the first attribute feature to the attack feature library, the website attack protection apparatus receives the second access request sent to the target website, and obtains the at least one second attribute feature carried in the second access request. It may be understood that, the second access request and the first access request are both requests for accessing the target website. Further, the at least one second attribute feature is one or a combination of several of Accept, Cookie, Referer, and User-Agent.

S1010: Match the second attribute feature by using the attack feature library.

Specifically, the website attack protection apparatus matches the second attribute feature by using the attack feature library. In this way, whether the second attribute feature is the attack feature is determined by matching each attack feature in the attack feature library with the second attribute feature.

S1011: If the first attribute feature matching the second attribute feature exists in the attack feature library, determine that the second access request is an attack access request, and perform anti-attack processing on the second access request.

Specifically, if the first attribute feature matching the second attribute feature exists in the attack feature library, the website attack protection apparatus determines that the second attribute feature is the attack feature, to determine that the second access request is the attack access request. It may be understood that, the first attribute feature determined as the attack feature is added to the attack feature library in step S1008. Therefore, the first attribute feature matching with the second attribute feature is determined as an attribute feature of the attack feature.

In a feasible solution, the anti-attack processing may include a processing manner of sending a verification code to a user terminal that sends the second access request. In this way, after receiving a verification code that is the same as that fed back by the user terminal, the website attack protection apparatus sends the second access request to a server corresponding to the target website. If the website attack protection apparatus does not receive a verification code fed back by the user terminal or a verification code that is different from the verification code, the website attack protection apparatus continues to send another verification code to the user terminal or discard the second access request.

In a feasible solution, the anti-attack processing may include a processing manner of sending a verification algorithm to a user terminal that sends the second access request. If the user terminal is capable of feeding back a verification result to the website attack protection apparatus by using the verification algorithm. After detecting that the verification result is correct, the website attack protection apparatus may send the second access request to a server corresponding to the target website. If the user terminal does not return a verification result to the website attack protection apparatus or the website attack protection apparatus detects that a verification result is incorrect, the website attack protection apparatus discards the second access request.

In a feasible solution, the anti-attack processing may include a processing manner of discarding the second access request. After determining that the second access request is the attack access request, the website attack protection apparatus directly discard the second access request.

In a feasible solution, the anti-attack processing may include a processing manner of disconnecting a connection to a user terminal that sends the second access request. For example, a Transmission Control Protocol (TCP) connection related to the second access request is discarded.

The foregoing are examples of the anti-attack processing, and the foregoing several manners are not limited in this embodiment of this application.

S1012: If the first attribute feature matching the second attribute feature does not exist in the attack feature library, send the second access request to a server corresponding to the target website.

Specifically, if the first attribute feature matching the second attribute feature does not exist in the attack feature library, the website attack protection apparatus sends the second access request to the server corresponding to the target website, so that the server processes and feeds back the second access request.

In this embodiment of this application, the plurality of first access requests including the at least one first attribute feature that is sent to the target website within the preset time range is obtained, statistics on the quantity of times that each first attribute feature appears in the plurality of first access requests are collected, and the first attribute feature is determined as the attack feature according to the quantity of times that the first attribute feature appears. In this way, statistics on the quantity of times that the first attribute feature appears in the first access request are collected to determine the attack feature, so that a currently existing attack feature is determined in time during real-time access to the website, thereby improving the efficiency for detecting the attack feature.

Figure 11:
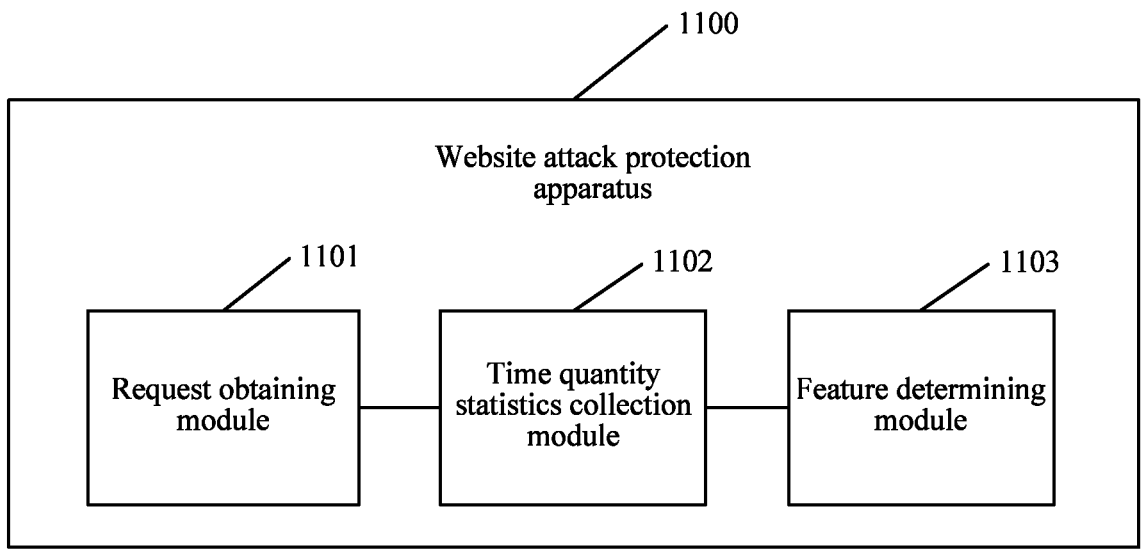
FIG. 11 is a schematic structural diagram of a website attack protection apparatus according to an embodiment of this application.
Figure 12:
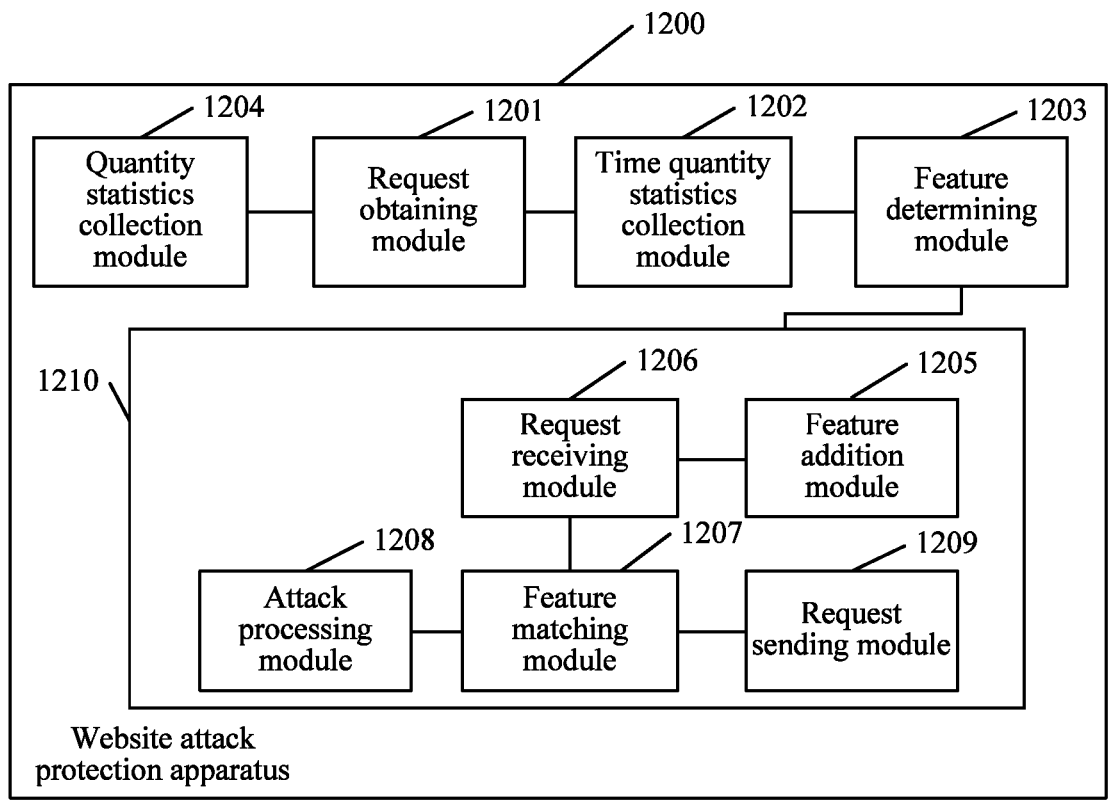
FIG. 12 is a schematic structural diagram of another website attack protection apparatus according to an embodiment of this application.
Figure 13:
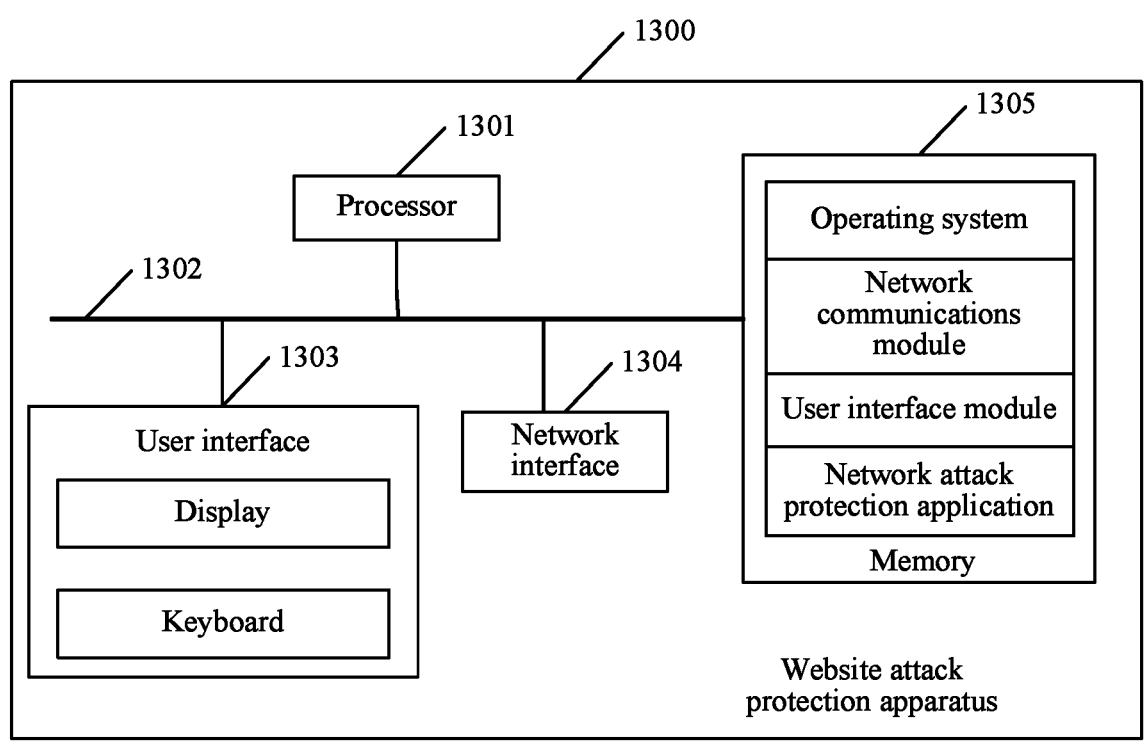
FIG. 13 is a schematic structural diagram of another website attack protection apparatus according to an embodiment of this application.

A website attack protection apparatus provided in an embodiment of this application is described below in detail with reference to FIG. 11 to FIG. 13. It should be noted that the website attack protection apparatus shown in FIG. 11 to FIG. 13 is configured to perform the methods in the embodiments shown in FIG. 9 and FIG. 10 of this application. For ease of description, only a part related to the embodiments of this application is shown. For specific technical details that are not disclosed, refer to the embodiments shown in FIG. 9 and FIG. 10 of this application.

Referring to FIG. 11, FIG. 11 is a schematic structural diagram of a website attack protection apparatus according to an embodiment of this application. As shown in FIG. 11, the website attack protection apparatus 1100 in this embodiment of this application may include a request obtaining module 1101, a time quantity statistics collection module 1102, a feature determining module 1103, and a protection processing module 1104.

The request obtaining module 1101 is configured to obtain a plurality of first access requests sent to a target website within a preset time range, where the first access request carries at least one first attribute feature, and the at least one first attribute feature is one or a combination of several of Accept, Cookie, Referer, and User-Agent.

Specifically, the request obtaining module 1101 obtains the plurality of first access requests sent to the target website within the preset time range. The preset time range is customized by the web site attack protection apparatus 1100. The target website may be any website that a user can access, for example, an enterprise website, a personal website, a commercial website, a government website, or an education website. The user may access the target website by using a web page browser.

Further, at least one first attribute feature is one or a combination of several of Accept, Cookie, Referer, and User-Agent. For example, the first access request may be an HTTP request. The first attribute feature is carried in a header field of the HTTP request. The Accept is used to indicate a data type supported by a user terminal that sends the first access request; the Cookie is used to indicate a text file stored in the user terminal that sends the first access request; the Referer is used to indicate a URL used by the user terminal that sends the first access request; and the User-Agent is used to indicate a system environment of the user terminal that sends the first access request. The system environment includes a used operating system and its version, a CPU type, a browser version, a browser language, a browser plug-in, and the like.

In some embodiments, the request obtaining module 1101 in this embodiment of this application obtains the first access request that is within the preset time range, or the request obtaining module 1101 may obtain a preset quantity of first access requests. This is not limited in this embodiment of this application.

In some embodiments, the website attack protection apparatus 1100 may perform a step of obtaining the plurality of first access requests that are within the preset time range when monitoring the first access request for accessing the target website, thereby implementing a function of monitoring any access request for the target website in real-time.

The time quantity statistics collection module 1102 is configured to collect statistics on a quantity of times that the first attribute feature appears in the plurality of first access requests.

Specifically, the time quantity statistics collection module 1102 collects statistics on a quantity of times that each of the at least one first attribute feature appears in the plurality of first access requests. Description is made by using an example in which the first attribute feature is the "User-Agent", it is assumed that there are 1000 requests within the preset time range, because the User-Agent is used to indicate the system environment of the user terminal that sends the first access request, it is assumed that in the 1000 requests, information corresponding to the User-Agent includes: the QQ search engine, the Baidu search engine, the Sogou search engine, the 360 search engine, and the like. The time quantity statistics collection module 1102 collects statistics on a quantity of times that information corresponding to each User-Agent appears in the 1000 requests, for example, a quantity of times that the Baidu search engine appears in the 1000 requests, and a quantity of times that the QQ search engine appears in the 1000 requests.

The feature determining module 1103 is configured to determine, according to the quantity of times that the first attribute feature appears, that the first attribute feature is an attack feature.

Specifically, the feature determining module 1103 determines, according to the quantity of times that the first attribute feature appears, that the first attribute feature is the attack feature. In a feasible solution, the website attack protection apparatus 1100 may determine, by setting a threshold indicating a maximum quantity of times that the first attribute feature appears, whether the first attribute feature is the attack feature. Alternatively, in another feasible solution, the website attack protection apparatus 1100 may determine, by setting a threshold indicating a maximum appearance probability, whether the first attribute feature is the attack feature. It may be understood that a probability that the first attribute feature appears in the preset time range is: dividing the quantity of times that the first attribute feature appears in the preset time range by a quantity of the first access requests within the preset time range.

In this embodiment of this application, the plurality of first access requests including the at least one first attribute feature that is sent to the target website within the preset time range is obtained, statistics on the quantity of times that each first attribute feature appears in the plurality of first access requests are collected, and the first attribute feature is determined as the attack feature according to the quantity of times that the first attribute feature appears. In this way, statistics on the quantity of times that the first attribute feature appears in the first access request are collected to determine the attack feature, so that a currently existing attack feature is determined in time during real-time access to the website, thereby improving the efficiency for detecting the attack feature.

The protection processing module 1104 is configured to determine, according to the attack feature, whether a second access request for accessing the website is an attack access request; and if yes, perform anti-attack processing on the second access request.

Referring to FIG. 12, FIG. 12 is a schematic structural diagram of another website attack protection apparatus according to an embodiment of this application. As shown in FIG. 12, the website attack protection apparatus 1200 in this embodiment of this application may include a request obtaining module 1201, a time quantity statistics collection module 1202, a feature determining module 1203, a quantity statistics collection module 1204, and an attack processing module 1210. The attack processing module 1210 includes a feature addition module 1205, a request receiving module 1206, a feature matching module 1207, an attack processing module 1208, and a request sending module 1209.

The quantity statistics collection module 1204 is configured to collect statistics on a quantity of access requests sent to a target website within a unit time range.

Specifically, the quantity statistics collection module 1204 collects statistics on the quantity of access requests sent to the target website within the unit time range. The unit time range may be predefined by the website attack protection apparatus 1200, for example, within 1 hour or within 20 minutes. Each time the website attack protection apparatus 1200 detects a request for accessing the target website within the unit time range, a quantity of access requests is increased by one, so that the quantity of access requests sent to the target website within the unit time range may be obtained.

The request obtaining module 1201 is configured to: if the quantity of access requests is greater than an access quantity threshold, obtain a plurality of first access requests sent to the target website within a preset time range.

Specifically, if the quantity of access requests within the unit time range is greater than the access quantity threshold, the request obtaining module 1201 obtains the plurality of first access requests sent to the target website within the preset time range. The preset time range is customized by the website attack protection apparatus 1200. The target website may be any website that a user can access, for example, an enterprise website, a personal website, a commercial website, a government website, or an education website. The user may access the target website by using a web page browser.

Further, at least one first attribute feature is one or a combination of several of Accept, Cookie, Referer, and User-Agent. For example, the first access request may be an HTTP request. The first attribute feature is carried in a header field of the HTTP request. The Accept is used to indicate a data type supported by a user terminal that sends the first access request; the Cookie is used to indicate a text file stored in the user terminal that sends the first access request; the Referer is used to indicate a URL used by the user terminal that sends the first access request; the User-Agent is used to indicate a system environment of the user terminal that sends the first access request. The system environment includes a used operating system and its version, a CPU type, a browser version, a browser language, a browser plug-in, and the like.

In some embodiments, the request obtaining module 1201 in this embodiment of this application obtains the first access request that is within the preset time range, or the request obtaining module 1201 may obtain a preset quantity of first access requests. This is not limited in this embodiment of this application.

It should be noted that, the preset time range and the unit time range may be a same time range, or may be different time ranges. For example, the preset time range is less than the unit time range, or the preset time range is greater than the unit time range. For example, if it is assumed that the preset time range and the unit time range are an hour range from a first moment, when detecting that a quantity of access requests that are within the one hour range is greater than the access quantity threshold, all access requests within the one hour range are obtained. For another example, it is assumed that the preset time range is two hours, and the unit time range is one hour, if it is detected that a quantity of access requests within an one hour range after a second moment is greater than the access quantity threshold, all access requests within a two hour range after the second moment are obtained.

In some embodiments, the access quantity threshold may be set according to a quantity of accesses that a server corresponding to the target website can bear within the unit time range.

The time quantity statistics collection module 1202 is configured to collect statistics on a quantity of times that the first attribute feature appears in the plurality of first access requests.

Specifically, the time quantity statistics collection module 1202 collects statistics on a quantity of times that each of the at least one first attribute feature appears in the plurality of first access requests. Description is made by using an example in which the first attribute feature is the "User-Agent", it is assumed that there are 1000 requests within the preset time range, because the User-Agent is used to indicate the system environment of the user terminal that sends the first access request, it is assumed that in the 1000 requests, information corresponding to the User-Agent includes: the QQ search engine, the Baidu search engine, the Sogou search engine, the 360 search engine, and the like. The time quantity statistics collection module 1202 collects statistics on a quantity of times that information corresponding to each User-Agent appears in the 1000 requests, for example, a quantity of times that the Baidu search engine appears in the 1000 requests, and a quantity of times that the QQ search engine appears in the 1000 requests.

The feature determining module 1103 is configured to determine, according to the quantity of times that the first attribute feature appears, that the first attribute feature is an attack feature.

The feature determining module includes a detection module 1231 and a determining module 1232.

The detection module 1231 is configured to detect whether the quantity of times that the first attribute feature appears is greater than an appearance time quantity threshold.

Specifically, the detection module 1231 detects whether the quantity of times that the first attribute feature appears is greater than the appearance time quantity threshold. The appearance time quantity threshold is predefined by the website attack protection apparatus 1200, and the appearance time quantity threshold may be set to different values according to different preset time ranges. If the quantity of times that the first attribute feature appears is greater than the appearance time quantity threshold, the determining module 1232 determines that the first attribute feature is the attack feature; or if the quantity of times that the first attribute feature appears is not greater than the appearance time quantity threshold, the determining module 1232 determines that the first attribute feature is not the attack feature.

The determining module 1232 is configured to: if the quantity of times that the first attribute feature appears and that is detected by the detection module is greater than the appearance time quantity threshold, determine that the first attribute feature is the attack feature.

Specifically, if the quantity of times that the first attribute feature appears is greater than the appearance time quantity threshold, the determining module 1232 determines that the first attribute feature is the attack feature.

Specifically, if the quantity of times that the first attribute feature appears is not greater than the appearance time quantity threshold, it is determined that the first attribute feature is not the attack feature.

The feature addition module 1205 is configured to: if it is determined that the first attribute feature is the attack feature, add the first attribute feature to an attack feature library.

Specifically, if it is determined that the first attribute feature is the attack feature, the feature addition module 1205 adds the first attribute feature to the attack feature library. The attack feature library includes a plurality of attack features used to detect access requests.

In some embodiments, the website attack protection apparatus 1200 may modify or delete the attack feature in the attack feature library or add an attack feature to the attack feature library, so that attack features stored in the attack feature library are more completed, thereby improving the effectiveness for detecting the attack feature.

The request receiving module 1206 is configured to receive a second access request sent to the target website, and obtain at least one second attribute feature carried in the second access request.

Specifically, after adding the first attribute feature to the attack feature library, the request receiving module 1206 receives the second access request sent to the target website, and obtains the at least one second attribute feature carried in the second access request. It may be understood that, the second access request and the first access request are both requests for accessing the target website. Further, the at least one second attribute feature is one or a combination of several of Accept, Cookie, Referer, and User-Agent.

The feature matching module 1207 is configured to match the second attribute feature by using the attack feature library.

Specifically, the feature matching module 1207 matches the second attribute feature by using the attack feature library. In this way, whether the second attribute feature is the attack feature is determined by matching each attack feature in the attack feature library with the second attribute feature.

The attack processing module 1208 is configured to: if the first attribute feature matching the second attribute feature exists in the attack feature library, determine that the second access request is the attack access request, and perform anti-attack processing on the second access request.

Specifically, if the first attribute feature matching the second attribute feature exists in the attack feature library, the attack processing module 1208 determines that the second attribute feature is the attack feature, to determine that the second access request is the attack access request. It may be understood that, the feature addition module 1205 adds the first attribute feature determined as the attack feature to the attack feature library. Therefore, the first attribute feature matching with the second attribute feature is determined as an attribute feature of the attack feature.

In a feasible solution, the anti-attack processing may include a processing manner of sending a verification code to a user terminal that sends the second access request. In this way, after receiving a verification code that is the same as that fed back by the user terminal, the second access request may be sent to the server corresponding to the target website. If a verification code fed back by the user terminal is not received or a verification code that is different from the verification code is received, another verification code is continued to be sent to the user terminal or the second access request is discarded.

In a feasible solution, the anti-attack processing may include a processing manner of sending a verification algorithm to a user terminal that sends the second access request. If the user terminal is capable of feeding back a verification result to the website attack protection apparatus 1200 by using the verification algorithm. After detecting that the verification result is correct, the website attack protection apparatus 1200 may send the second access request to the server corresponding to the target website. If the user terminal does not return a verification result to the website attack protection apparatus 1200 or the website attack protection apparatus 1200 detects that a verification result is incorrect, the website attack protection apparatus discards the second access request.

In a feasible solution, the anti-attack processing may include a processing manner of discarding the second access request. After determining that the second access request is the attack access request, the attack processing module 1208 directly discards the second access request.

In a feasible solution, the anti-attack processing may include a processing manner of disconnecting a connection to a user terminal that sends the second access request. For example, a TCP connection related to the second access request is discarded.

The foregoing are examples of the anti-attack processing, and the foregoing several manners are not limited in this embodiment of this application.

The request sending module 1209 is configured to: if the first attribute feature matching the second attribute feature does not exist in the attack feature library, send the second access request to the server corresponding to the target website.

Specifically, if the first attribute feature matching the second attribute feature does not exist in the attack feature library, the request sending module 1209 sends the second access request to the server corresponding to the target website, so that the server processes and feeds back the second access request.

In this embodiment of this application, the plurality of first access requests including the at least one first attribute feature that is sent to the target website within the preset time range is obtained, statistics on the quantity of times that each first attribute feature appears in the plurality of first access requests are collected, and the first attribute feature is determined as the attack feature based on the quantity of times that the first attribute feature appears. In this way, statistics on the quantity of times that the first attribute feature appears in the first access request are collected to determine the attack feature, so that a currently existing attack feature is determined in time during real-time access to the website, thereby improving the efficiency for detecting the attack feature.

Referring to FIG. 13, FIG. 13 is a schematic structural diagram of another website attack protection apparatus according to an embodiment of this application. As shown in FIG. 13, the website attack protection apparatus 1300 may include at least one processor 1301 such as a CPU, at least one network interface 1304, a user interface 1303, a memory 1305, and at least one communications bus 1302. The communications bus 1302 is configured to implement connection and communication between the components. The user interface 1303 may include a display and a keyboard. The user interface 1303 may further include a standard wired interface and a standard wireless interface. In some embodiments, the network interface 1304 may include a standard wired interface and a standard wireless interface (such as a WiFi interface). The memory 1305 may be a high-speed RAM memory, or may be a non-volatile memory, for example, at least one magnetic disk memory. In some embodiments, the memory 1305 may alternatively be at least one storage apparatus far away from the processor 1301. As shown in FIG. 13, the memory 1305, which is used as a computer storage medium, may include an operating system, a network communications module, a user interface module, and a website attack protection apparatus application.

In the website attack protection apparatus 1300 shown in FIG. 13, the user interface 1303 is mainly configured to provide an input interface to a user, to receive information set by the user, for example, an appearance time quantity threshold, a preset time range, a unit time range, and an access quantity threshold. The processor 1301 may be configured to invoke the website attack protection apparatus application stored in the memory 1305, and is specifically configured to perform the following operations:

obtaining a plurality of first access requests sent to a target website within a preset time range, where the first access request carries at least one first attribute feature, and the at least one first attribute feature is one or a combination of several of Accept, Cookie, Referer, and User-Agent;

collecting statistics on a quantity of times that the first attribute feature appears in the plurality of first access requests;

determining, according to the quantity of times that the first attribute feature appears, that the first attribute feature is an attack feature; and determining, according to the attack feature, whether a second access request for accessing the website is an attack access request; and if yes, performing anti-attack processing on the second access request.

In an exemplary embodiment, before obtaining the plurality of first access requests sent to the target website within the preset time range, the processor 1301 is further configured to:

collect statistics on a quantity of access requests sent to the target website within a unit time range; and if the quantity of access requests is greater than an access quantity threshold, perform the step of obtaining a plurality of first access requests sent to a target website within a preset time range.

In an exemplary embodiment, when determining, according to the quantity of times that the first attribute feature appears, that the first attribute feature is the attack feature, the processor 1301 is specifically configured to:

detect whether the quantity of times that the first attribute feature appears is greater than an appearance time quantity threshold; and if yes, determine that the first attribute feature is the attack feature.

In an exemplary embodiment, the processor 1301 is further configured to:

if determining that the first attribute feature is the attack feature, add the first attribute feature to an attack feature library.

In an exemplary embodiment, the processor 1301 is further configured to:

receive the second access request sent to the target website, and obtain at least one second attribute feature carried in the second access request;

match the second attribute feature by using the attack feature library; and if the first attribute feature matching the second attribute feature exists in the attack feature library, determine that the second access request is the attack access request, and perform anti-attack processing on the second access request; or if the first attribute feature matching the second attribute feature does not exist in the attack feature library, send the second access request to a server corresponding to the target website.

In an exemplary embodiment, the anti-attack processing includes any one of a processing manner of sending a verification code to a user terminal that sends the second access request, a processing manner of discarding the second access request, and a processing manner of disconnecting a connection to the user terminal that sends the second access request.

It should be noted that, the steps performed by the processor 1301 that are described in this embodiment of this application may be specifically implemented according to the method in the method embodiment shown in FIG. 9 or FIG. 10, and details are not described herein again.

The modules in this embodiment of this application may be implemented by using a universal integrated circuit such as a central processing unit (CPU) or an application-specific integrated circuit (ASIC).

A person of ordinary skill in the art should understand that all or some of the steps in the methods of the foregoing embodiments may be implemented by using a program instructing relevant hardware. The program may be stored in a computer readable storage medium. The storage medium may include a read only memory (ROM), a random access memory (RAM), a magnetic disk, an optical disk, or the like.

The website attack detection method and system provided in the embodiments of the present invention are described in detail above. Principles and implementations of this application are explained herein by using specific embodiments. Descriptions of the embodiments are merely used to help understand the method and core idea of this application. Meanwhile, a person of ordinary skill in the art can have variations in specific implementations and the application scope based on the idea of this application. In conclusion, content of the present specification should not be construed as a limitation to this application.

What is claimed is:

1. A website attack detection method performed by a computing device having one or more processors and memory storing a plurality of programs to be executed by the computing device, the method comprising:

detecting a request for accessing a website, the request for accessing the website including a header comprising a plurality of fields;

calculating a statistical average parameter value of an information entropy parameter corresponding to each of the plurality of fields; and determining, in accordance with a determination that the statistical average parameter value of the information entropy parameter of the field is less than a corresponding first threshold or a ratio of the information entropy parameter of the field to a corresponding baseline value is less than a corresponding second threshold, that the website suffers a Challenge Collapsar attack.

2. The method according to claim 1, further comprising: before determining that the website suffers a Challenge Collapsar attack:

determining that a plurality of historical access requests when the website does not suffer a Challenge Collapsar attack as request samples;

respectively calculating parameter values of information entropy parameters of all fields comprised in a header of each of the plurality of historical access requests; and collecting average statistics on parameter value ranges of the information entropy parameters corresponding to all the fields or collecting statistics on baseline values of the information entropy parameters corresponding to all the fields, wherein the first preset range is the parameter value range of the information entropy parameter corresponding to the field, and the variation degree of the parameter value of the information entropy parameter corresponding to the field is a ratio of the parameter value of the information entropy parameter of the field to the corresponding baseline value.

3. The method according to claim 2, wherein the collecting average statistics on baseline values of the information entropy parameter corresponding to the field further comprises: using an average value of the parameter values that are of the information entropy parameter corresponding to the field and that are comprised in the plurality of request samples as the baseline value.

4. The method according to claim 1, further comprising:
obtaining a plurality of first access requests sent to the website within a preset time range, wherein the first access request carries at least one first attribute feature, and the at least one first attribute feature is one or a combination of several of Accept, Cookie, Referer, and User-Agent;
collecting statistics on a quantity of times that the first attribute feature appears in the plurality of first access requests;
determining, according to the quantity of times that the first attribute feature appears, that the first attribute feature is an attack feature; and
determining, according to the first attribute feature, whether a second access request for accessing the website is an attack access request; and if yes, performing anti-attack processing on the second access request.

5. The method according to claim 4, wherein the determining, according to the quantity of times that first attribute feature appears, that the first attribute feature is an attack feature comprises:
detecting whether the quantity of times that the first attribute feature appears is greater than an appearance time quantity threshold; and
if yes, determining that the first attribute feature is the attack feature.

6. The method according to claim 4, further comprising:
if it is determined that the first attribute feature is the attack feature, adding the first attribute feature to an attack feature library; and
the determining, according to the first attribute feature, whether a second access request for accessing the website is an attack access request comprises:
receiving the second access request sent to the website, and obtaining at least one second attribute feature carried in the second access request;
matching the second attribute feature by using the attack feature library; and
if the first attribute feature matching the second attribute feature exists in the attack feature library, determining that the second access request is the attack access request.

7. The method according to claim 4, wherein the anti-attack processing comprises any one of the following:
sending a verification code to a user terminal that sends the second access request;
discarding the second access request; and
disconnecting a connection to the user terminal that sends the second access request.

8. A computing device for website attack detection, comprising:
one or more processors;
memory connected to the one or more processors; and
a plurality of programs stored in the memory that, when executed by the one or more processors, cause the computing device to perform a plurality of operations including:
detecting a request for accessing a website, the request for accessing the website including a header comprising a plurality of fields;
calculating a statistical average parameter value of an information entropy parameter corresponding to each of the plurality of fields; and
determining, in accordance with a determination that the statistical average parameter value of the information entropy parameter of the field is less than a corresponding first threshold or a ratio of the information entropy parameter of the field to a corresponding baseline value is less than a corresponding second threshold, that the website suffers a Challenge Collapsar attack.

9. The computing device according to claim 8, wherein the plurality of operations further comprise:
before determining that the website suffers a Challenge Collapsar attack:
determining that a plurality of historical access requests when the website does not suffer a Challenge Collapsar attack as request samples;
respectively calculating parameter values of information entropy parameters of all fields comprised in a header of each of the plurality of historical access requests; and
collecting average statistics on parameter value ranges of the information entropy parameters corresponding to all the fields or collecting statistics on baseline values of the information entropy parameters corresponding to all the fields, wherein the first preset range is the parameter value range of the information entropy parameter corresponding to the field, and the variation degree of the parameter value of the information entropy parameter corresponding to the field is a ratio of the parameter value of the information entropy parameter of the field to the corresponding baseline value.

10. The computing device according to claim 9, wherein the collecting average statistics on baseline values of the information entropy parameter corresponding to the field further comprises: using an average value of the parameter values that are of the information entropy parameter corresponding to the field and that are comprised in the plurality of request samples as the baseline value.

11. The computing device according to claim 8, wherein the plurality of operations further comprise:
obtaining a plurality of first access requests sent to the website within a preset time range, wherein the first access request carries at least one first attribute feature, and the at least one first attribute feature is one or a combination of several of Accept, Cookie, Referer, and User-Agent;
collecting statistics on a quantity of times that the first attribute feature appears in the plurality of first access requests;

determining, according to the quantity of times that the first attribute feature appears, that the first attribute feature is an attack feature; and determining, according to the first attribute feature, whether a second access request for accessing the website is an attack access request; and if yes, performing anti-attack processing on the second access request.

12. The computing device according to claim 11, wherein the determining, according to the quantity of times that first attribute feature appears, that the first attribute feature is an attack feature comprises:

detecting whether the quantity of times that the first attribute feature appears is greater than an appearance time quantity threshold; and if yes, determining that the first attribute feature is the attack feature.

13. The computing device according to claim 11, wherein the plurality of operations further comprise:

if it is determined that the first attribute feature is the attack feature, adding the first attribute feature to an attack feature library; and the determining, according to the first attribute feature, whether a second access request for accessing the website is an attack access request comprises:

receiving the second access request sent to the website, and obtaining at least one second attribute feature carried in the second access request;

matching the second attribute feature by using the attack feature library; and if the first attribute feature matching the second attribute feature exists in the attack feature library, determining that the second access request is the attack access request.

14. The computing device according to claim 11, wherein the anti-attack processing comprises any one of the following:

sending a verification code to a user terminal that sends the second access request;

discarding the second access request; and disconnecting a connection to the user terminal that sends the second access request.

15. A non-transitory computer readable storage medium storing a plurality of instructions in connection with a computing device having one or more processors for website attack detection, wherein the plurality of instructions, when executed by the one or more processors, cause the computing device to perform a plurality of operations including:

detecting a request for accessing a website, the request for accessing the website including a header comprising a plurality of fields;

calculating a statistical average parameter value of an information entropy parameter corresponding to each of the plurality of fields; and determining, in accordance with a determination that the statistical average parameter value of the information entropy parameter of the field is less than a corresponding first threshold or a ratio of the information entropy parameter of the field to a corresponding baseline value is less than a corresponding second threshold, that the website suffers a Challenge Collapsar attack.

16. The non-transitory computer readable storage medium according to claim 15, wherein the plurality of operations further comprise:

before determining that the website suffers a Challenge Collapsar attack:

determining that a plurality of historical access requests when the website does not suffer a Challenge Collapsar attack as request samples;

respectively calculating parameter values of information entropy parameters of all fields comprised in a header of each of the plurality of historical access requests; and collecting average statistics on parameter value ranges of the information entropy parameters corresponding to all the fields or collecting statistics on baseline values of the information entropy parameters corresponding to all the fields, wherein the first preset range is the parameter value range of the information entropy parameter corresponding to the field, and the variation degree of the parameter value of the information entropy parameter corresponding to the field is a ratio of the parameter value of the information entropy parameter of the field to the corresponding baseline value.

17. The non-transitory computer readable storage medium according to claim 16, wherein the collecting average statistics on baseline values of the information entropy parameter corresponding to the field further comprises: using an average value of the parameter values that are of the information entropy parameter corresponding to the field and that are comprised in the plurality of request samples as the baseline value.

18. The non-transitory computer readable storage medium according to claim 15, wherein the plurality of operations further comprise:

obtaining a plurality of first access requests sent to the website within a preset time range, wherein the first access request carries at least one first attribute feature, and the at least one first attribute feature is one or a combination of several of Accept, Cookie, Referer, and User-Agent;

collecting statistics on a quantity of times that the first attribute feature appears in the plurality of first access requests;

determining, according to the quantity of times that the first attribute feature appears, that the first attribute feature is an attack feature; and determining, according to the first attribute feature, whether a second access request for accessing the website is an attack access request; and if yes, performing anti-attack processing on the second access request.

* * * * *